United States Patent [19]

Hart

[11] Patent Number: 4,974,910
[45] Date of Patent: Dec. 4, 1990

[54] FREIGHT BRAKE CONTROL VALVE HAVING IMPROVED QUICK SERVICE FUNCTION

[75] Inventor: James E. Hart, Trafford, Pa.

[73] Assignee: American Standard Inc., Wilmerding, Pa.

[21] Appl. No.: 393,163

[22] Filed: Aug. 14, 1989

[51] Int. Cl.⁵ .......................... B60T 15/42; B60T 17/04
[52] U.S. Cl. ........................................ 303/38; 303/33; 303/35; 303/41
[58] Field of Search ........................ 303/38, 82, 35, 36, 303/37, 39, 33, 41, 42, 81, 86, 56

[56] References Cited

U.S. PATENT DOCUMENTS

| | | | |
|---|---|---|---|
| 1,929,576 | 10/1933 | Campbell | 303/33 |
| 2,050,783 | 8/1936 | Campbell | 303/38 X |
| 2,055,967 | 9/1936 | Campbell | 303/38 |
| 4,188,071 | 2/1980 | Hart | 303/33 |
| 4,776,642 | 10/1988 | Hart et al. | 303/41 X |
| 4,798,420 | 2/1989 | Rojecki | 303/38 |

Primary Examiner—Douglas C. Butler
Attorney, Agent, or Firm—G. J. Falce

[57] ABSTRACT

A freight brake control valve device for a railway vehicle having a service piston slide valve arranged with a detent to latch the service piston in preliminary quick service position until such time as the application pressure differential acting on the piston exceeds a predetermined value.

19 Claims, 2 Drawing Sheets

FREIGHT BRAKE CONTROL VALVE HAVING IMPROVED QUICK SERVICE FUNCTION

BACKGROUND OF THE INVENTION

The present invention relates to pneumatic brake control systems for railway vehicles and particularly to the quick service function provided by such brake control systems.

Conventional ABD type brake control valve devices, as are typically employed on railroad freight cars, incorporate a quick service feature in which compressed air in the train brake pipe is vented locally at each car of the train when a brake application is initiated, in order to propagate the brake application signal through the train. A service piston of the control valve device is operable between brake release and service application positions in accordance with the predominance of brake pipe pressure on one side of the piston and auxiliary reservoir pressure on the opposite side. The service piston carries a graduating valve that is fixed with the piston for direct movement therewith and a slide valve that moves with the piston through a lost-motion connection. Accordingly, relative motion exists between the slide valve and graduating valve during initial piston movement in both the application and release directions.

There is less frictional resistance to movement of the graduated valve than the slide valve. The initial movement of the service piston toward application position in response to a reduction of brake pipe pressure therefore moves the graduating valve relative to the slide valve to establish a flow path via which brake pipe pressure is connected to a vented quick service bulb. This local venting of brake pipe pressure supplements the trainline reduction of brake pipe pressure to promote the further movement of the service piston and slide valve to service position, and also to accelerate the brake application signal through the train for faster brake response. In the ABD type valve, this is commonly referred to as "preliminary quick service."

A bias force in the form of a leaf spring acts laterally on the slide valve to provide face-to-face sealing pressure at the interface of the slide valve and its seat in the slide valve bushing. The slide valve is also pressed to its seat by air pressure. This combined spring load and air load on the slide valve causes frictional resistance that the service piston encounters upon engagement with the slide valve following the initial piston movement to preliminary quick service position. The resistance imparted by the slide valve, combined with the compressive force of the piston stabilizing spring, thus determines the application differential between brake pipe and auxiliary reservoir pressure that is required to move the service piston beyond quick service position to service application position.

It will be appreciated that the duration the service piston remains in quick service position, prior to moving the slide valve, has a direct influence on the degree of quick service activity, and, conversely, the effectiveness of quick service in locally reducing brake pipe pressure influences the time required to develop sufficient differential to move to service position and terminate quick service. Because of this self-regulating feature, quick service is automatically effective for different individual car lengths or volumes of brake pipe.

Because of manufacturing tolerances and other variables which influence the resistance to slide valve movement, the actual application differential and thus the duration the service piston remains in quick service position varies somewhat from car to car. Consequently, the optimum propagation rate of the brake application signal is not always realized.

Whenever the application differential increases sufficiently to overcome the piston resistance, the slide valve and graduating valve move in unison with the service piston to sequentially cut off the quick service flow path and to establish an application flow path between the auxiliary reservoir and brake cylinder. However, because of the close proximity of the porting in the piston slide valve, manufacturing tolerances can also cause a port overlap condition to arise in which the application flow path cracks open before the quick service flow path is fully cut off, thereby causing the piston to stall, particularly when the application differential acting on the service piston is relatively low. Such a condition further degrades the propagation rate of the brake application signal.

When it is desired to release the brake, the release differential required between brake pipe and auxiliary reservoir pressures is governed principally by the same frictional resistance to move the slide valve back.

SUMMARY OF THE INVENTION

An object of the present invention, therefore, is to improve the quick service performance of a freight brake control valve device of the ABD type.

An extension of the foregoing objective is to provide increased quick service activity without adversely affecting other control functions, particularly release, performed by the control valve service piston.

Another extension of the foregoing is to positively maintain the service piston in quick service position until a somewhat higher application pressure differential develops than heretofore realized.

A final object of the invention is to actuate the service piston from preliminary quick service position to application position with snap-action to prevent piston stall.

In carrying out these objectives, the invention consists essentially of a control valve device for a railway vehicle having a piston abutment subject on opposite sides to the pressure carried in a train brake pipe and to the pressure of an auxiliary reservoir that is charged from the brake pipe. The piston abutment is movable from a release position to a service application position in response to an application pressure differential due to a reduction of the brake pipe pressure relative to the auxiliary reservoir pressure. A valve device operated by the piston abutment exhausts brake pipe pressure locally at each car of the train in a preliminary quick service position of the piston abutment that lies intermediate release and service application positions. There is provided detent means for retarding movement of the piston abutment in this preliminary quick service position until a somewhat higher application pressure differential develops in accordance with the trainline reduction of brake pipe pressure combined with the local reduction of brake pipe pressure during quick service.

BRIEF EXPLANATION OF THE DRAWINGS

These and other objects and advantages of the invention will be realized from the following more detailed description when taken with the drawings in which.

DESCRIPTION AND OPERATION

Figure 1:
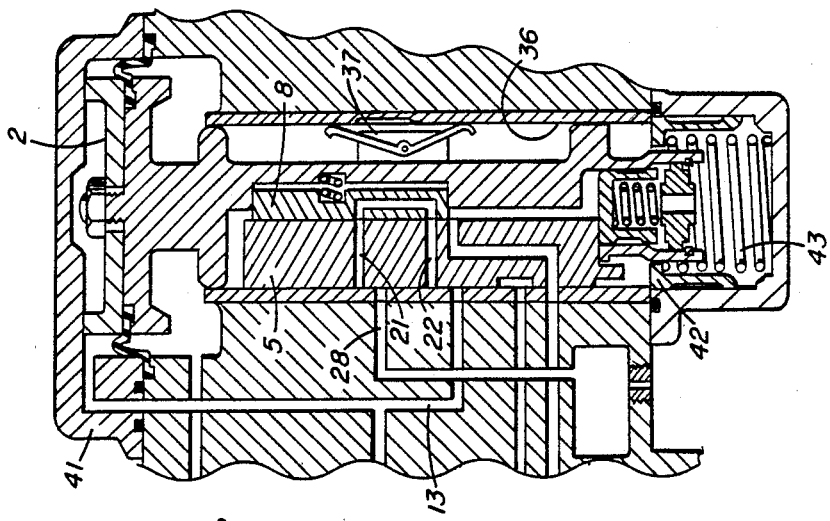
FIGS. 1, 2, and 3 are diagrammatic views showing different positions of a control valve service piston incorporating the present invention.
Figure 2:
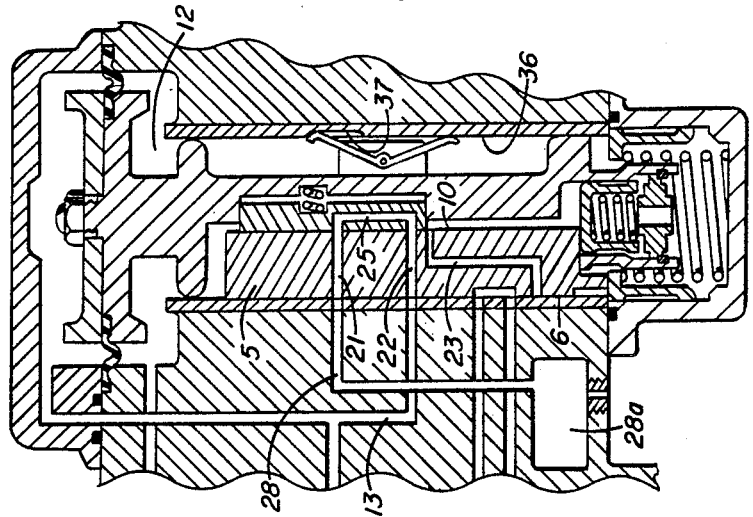
Figure 3:
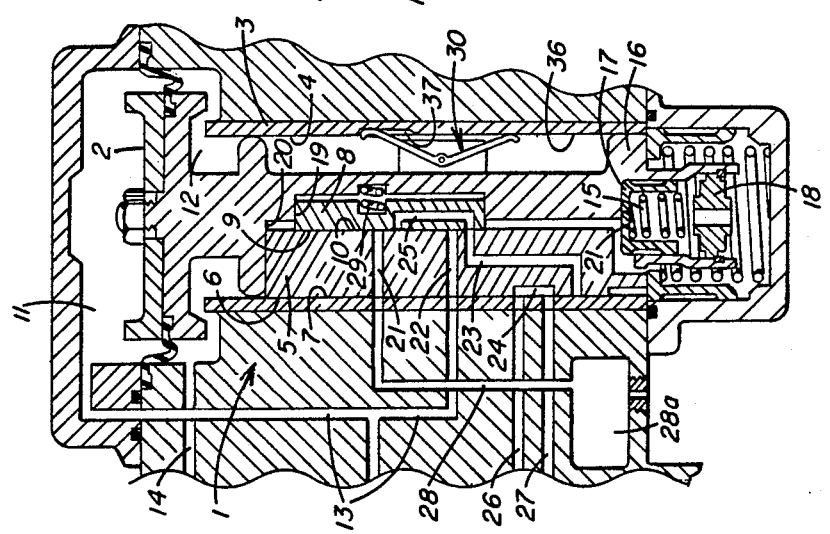

Referring now to FIGS. 1, 2, and 3, there is shown a service piston valve assembly 1 of a railway freight brake control valve device, such as a well-known ABD type control valve that is modified in accordance with the present invention. Piston valve assembly 1 includes a service piston 2, a bushing 3 having a bore 4 in which piston 2 is operably disposed, a slide valve 5 carried by piston 2 having a face 6 engageable with an adjoining face 7 of bushing 3 that forms a slide valve seat and a graduating valve 8 having a face 9 engageable with an adjoining face 10 of slide valve 5.

Formed on opposite sides of piston 2 are pressure chambers 11 and 12 which are connected respectively to the train brake pipe (not shown) via a passage 13 which terminates at slide valve face 6 and to an auxiliary reservoir (not shown) via a passage 14, the latter being charged with pressure from the brake pipe via a charging passage and choke (not shown) in slide valve 5.

A stabilizing spring 15 is carried in the tail 16 of piston 2 between a spring guide 17 and a spring seat 18. Graduating valve 8 is fixed in a recess 19 of piston 2, while slide valve 5 is carried in another recess 20 of piston 2, so as to have a lost-motion connection with the piston. Spring guide 17 is supported in a further recess 21 of piston 2 forming one side of recess 20. Being spring-loaded, spring guide 17 is deflectable upon engagement with slide valve 5 to provide the afore-mentioned lost-motion connection with piston 2.

Slide valve 5 is provided with quick service passages 21 and 22 that extend between the slide valve faces 6 and 10; an application passage 23 that also extends between faces 6 and 10; and a groove 24 in face 6. Graduating valve 8 is provided with a passage 25 having its opposite ends opening in face 9. An exhaust passageway 26 in the valve body is connected from the slide valve face 7 to atmosphere, while a delivery passage 27 in the valve body is connected from the slide valve face 7 to a brake cylinder device (not shown). A quick service passage 28 in the valve body is connected from the face 7 of bushing 3 to a quick service volume 28a that is vented to atmosphere. A helical spring 29 between graduating valve 8 and piston 2 provides sealing pressure to prevent leakage of compressed air at the slide valve/graduating valve interface. Likewise, a leaf-type spring 30 between slide valve 5 and bushing 3 establishes a pressure seal at the slide valve/bushing interface.

Figure 4:
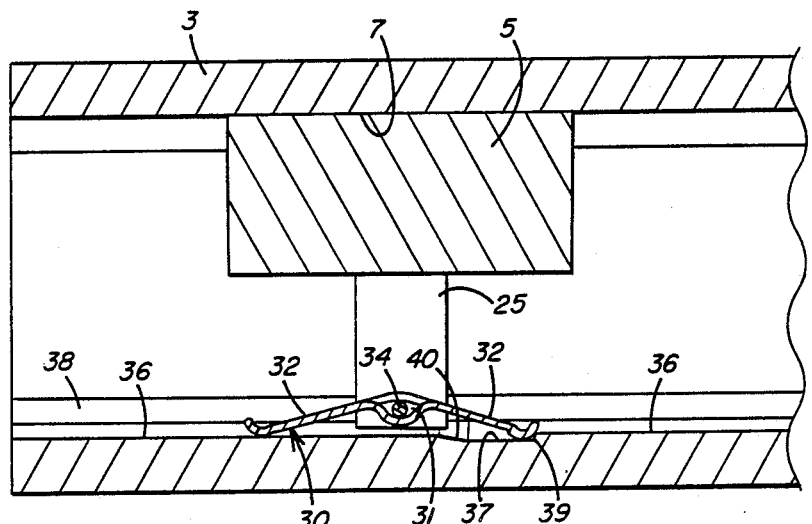
FIG. 4 is a section view of a slide valve and bushing seat with a spring detent arrangement.

As best seen in FIG. 4, leaf spring 30 is provided with a generally cylindrical opening 31 which is formed laterally between oppositely extending, angularly disposed arms 32 and 33, this opening 31 being somewhat larger than the diameter of a roll pin 34 to accommodate passage of the roll pin through opening 31 and into conforming holes in bifurcated lateral extensions 35 of slide valve 5 that straddle piston 2. Each arm 32 and 33 is formed with an upturned end that bears on the land of a surface 36 of bushing bore 4 that is diametrically opposite the portion of the bushing face 7 that forms the slide valve seat. During assembly of piston 2 into bushing 3, the arms of leaf spring 30 are deflected in compression in the direction of opening 31 to accommodate entry of the slide valve within bushing 3. This deflection of arms 32 and 33 establishes compressive loading of slide valve 5 which provides the afore-mentioned pressure seal at the slide valve/bushing interface, as best shown in FIG. 4, with piston 2 and graduating valve 8 deleted for purposes of clarity.

Figure 5:
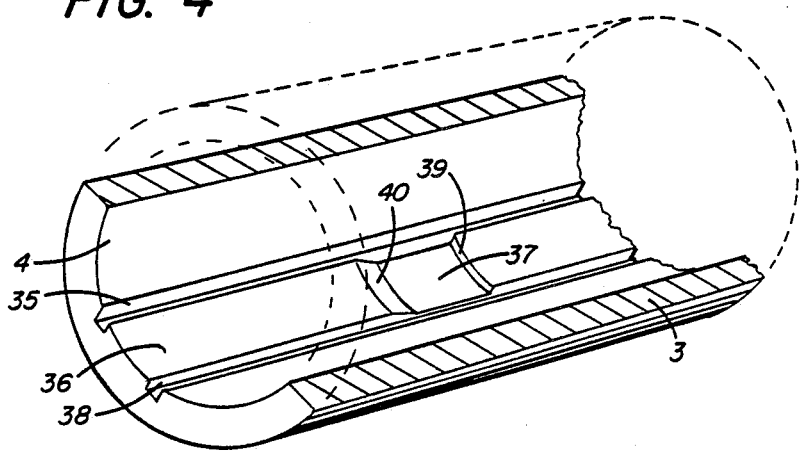
FIG. 5 is an oblique pictorial view of the bushing seat of FIG. 4 showing the recess for the spring detent.
Figure 6:
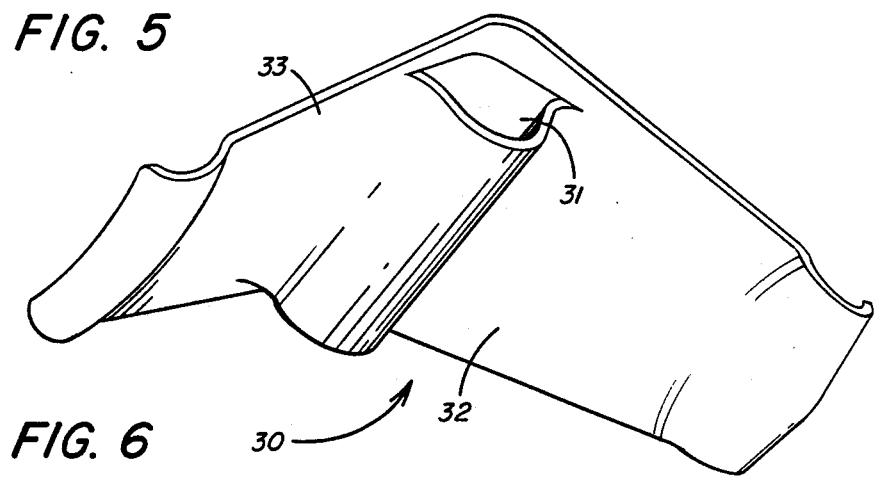
FIG. 6 is an axonometric pictorial view of the spring of FIG. 4 that operates in the spring detent recess.

Formed in surface 36 of bushing bore 4 is a recess or depression 37 that extends laterally between parallel guide channels 38 running axially along the inner diameter of bushing 3. A sidewall 39 of recess 37 is inclined preferably at an angle of 60° with the horizontal, as shown in FIGS. 4 and 5. The other sidewall 40 of recess 37 is in the form of a ramp having a relatively flat angle of inclination with the horizontal, preferably 20°. The axial location of recess 37 is such that the upturned end of leaf spring arm 32 abuts sidewall 39 of recess 37 when slide valve 5 is in the latched position shown in FIGS. 1 and 2, for a reason hereinafter explained. The ramp-like surface formed by sidewall 40 of recess 37 allows arm 33 of leaf spring 30 to ride out of the recess without any substantial resistance, to facilitate assembly of piston 2, slide valve 5, including leaf spring 30, and graduating valve 8 into bushing 3, such assembly being from the right-hand end of bushing 3, as viewed in FIG. 4. The depth of recess 37 is relatively shallow, being preferably between 0.020–0.030 inch, and so the compressive force exerted by spring 30 on slide valve 5 is not significantly different when one arm 32 is in recess 37, as compared to both arms 32 and 33 bearing on the land of surface 36.

A top cover 41 provides a stop to limit upward movement of piston 2 to service application position, as shown in FIG. 3, while a spring seat 42 that is forced by a helical spring 43 into engagement with the end of bushing 3 provides a stop to limit downward movement of piston 2 and thereby establish release position, the purpose of spring 43 being to provide a retarded recharge function, which forms no part of the present invention.

In release position of service piston 2, as shown in FIG. 1, slide valve 5 is positioned by piston 2 during its downward stroke, so that slide valve passages 21 and 22 are aligned with brake pipe passage 13 and quick service passage 28, respectively. Graduating valve 8 is concurrently positioned relative to slide valve 5 so that passage 25 is out of registry with slide valve passages 21 and 22 and in registry with application passage 23, this passage 23 being out of registry with delivery passage 27 at the slide valve/bushing interface. Delivery passage 27 is, in turn, registered with exhaust passage 26 via slide valve groove 24. It will be appreciated, therefore, that in release position, the delivery of auxiliary reservoir pressure to the brake cylinder is interrupted and brake pressure is accordingly released, while concurrently slide valve 5 is pre-conditioned, by its position relative to bushing 3, to establish a local, quick service reduction of brake pipe pressure upon subsequent initial movement of piston 2 and graduating valve 8 toward service application position, as hereinafter explained.

As previously mentioned, the upturned end of leaf spring arm 32 abuts sidewall 39 when slide valve 5 is so positioned by movement of piston 2 to release position, thereby latching slide valve 5 in a predetermined location relative to bushing 3. Upon a subsequent reduction of brake pipe pressure to initiate a brake application, in a well-known manner, a pressure differential is created between chambers 11 and 12 on opposite sides of piston 2, the predominant pressure being in chamber 12, so as to exert an upward-acting force on piston 2. As this upward-acting force moves piston 2 out of release position, stabilizing spring guide 17 encounters one end of the latched slide valve and further upward movement of piston 2 to preliminary quick service position is accommodated by compression of stabilizing spring 15, as shown in FIG. 2. The resultant lost-motion movement of piston 2 and graduating valve 8 relative to slide valve 5 aligns graduating valve passage 25 with slide valve passages 21 and 22 to establish a flow path via which brake pipe pressure is vented locally from brake pipe passage 13 to the vented quick service volume 28a.

It will be further noted in FIG. 2 that in this preliminary quick service position of piston 2, the end of graduating valve 8 uncovers application passage 23 at face 10 of slide valve 5, thereby connecting auxiliary reservoir pressure in chamber 12 to passage 23, but until slide valve 5 becomes unlatched from recess 37, this passage 23 remains cut off from delivery passage 27 at slide valve face 6.

It will now be appreciated that the angle of inclination of sidewall 39, the depth of recess 37, the degree of compression of spring 30 following assembly, and the spring rate all contribute to the latching force that the piston differential pressure must overcome before piston 2 can move from preliminary quick service position (FIG. 2) to service application position (FIG. 3). This application differential is essentially consistent, due to the positive and consistent latching feature of the invention. Moreover, there is no significant degradation of the pressure seal maintained at the slide valve/seat interface by spring 30 during the time the spring arm 32 is engaged with sidewall 39 within groove 37.

The time required to develop the predetermined pressure differential across piston 2, necessary to overcome the latching force on slide valve 5, determines the duration piston 2 remains in preliminary quick service position, and thus the amount of brake pipe air that is vented locally during quick service activity.

When sufficient pressure differential develops, due to the trainline reduction of brake pipe pressure combined with the local quick service reduction of brake pipe pressure, the force on piston 2 acting through slide valve 5 causes the upturned end of leaf spring arm 32 to ride up over sidewall 39 and onto the land of surface 36, increasing the compression on the spring arm 32. When this occurs, the resistance to piston movement provided by the latching force on slide valve 5 is suddenly removed, and piston 2 is driven positively to service application position against its stop provided by cover 41, as shown in FIG. 3. Both the slide valve 5 and graduating valve 8 move upwardly in unison with piston 2. Accordingly, slide valve passages 21 and 22 are moved out of registry with brake pipe passage 13 and quick service passage 28 to terminate this local quick service reduction of brake pipe pressure. Groove 24 in face 6 of slide valve 5 is moved out of registry with delivery passage 27 to terminate the venting of the brake cylinder, and slide valve application passage 23 is, in turn, registered with delivery passage 27 to connect auxiliary reservoir pressure to the brake cylinder.

When the trainline reduction of brake pipe pressure is halted, this flow of auxiliary reservoir pressure to the brake cylinder will reverse the application pressure differential across piston 2 and thereby move the piston in a downward direction to lap position (not shown). This occurs in a well-known manner, with lost-motion existing between piston 2 and the upper end of slide valve 5, causing graduating valve 8 to also move relative to slide valve 5 and accordingly cut off registry of application passage 23 with chamber 12 to terminate the brake application. This cutting off of auxiliary reservoir pressure to brake cylinder defines service lap position. It will be appreciated, at this point, that the slide valve resistance, due to the frictional force at the slide valve/bushing interface and the reducing force of stabilizing spring 15, sets the limit for this downward deflection of piston 2.

Only when the brake pipe pressure is increased in response to a desired release of the brakes is a release pressure differential developed which is sufficient to overcome the slide valve resistance and permit movement of piston 2 to release position, as shown in FIG. 1. It is important to note that, during this movement of piston 2 from lap position to release position, both arms 32 and 33 of leaf spring 30 ride on the land of surface 36. Consequently, the latching effect provided by spring 30 acting in conjunction with recess 37 does not come into play at all throughout the downward stroke of piston 2 and thus has no influence whatsoever on the various operating functions of piston valve assembly 1 other than to enhance the quick service function, as heretofore explained.

Just prior to tail 16 of piston 2 engaging spring seat 42, to define release position, as shown in FIG. 1, arm 32 of spring 30 drops over sidewall 39 into recess 37 preparatory to latching slide valve 5 in the position shown in FIG. 1, when piston 2 subsequently moves in an upward direction in response to a trainline reduction of brake pipe pressure, as previously explained. In release position, application passage 23 in slide valve 5 is moved out of registry with delivery passage 27, which is in turn registered with exhaust passage 26 via slide valve groove 24. Accordingly, the brake cylinder is vented to effect a brake release and piston valve assembly 1 is conditioned for another cycle of brake operation, in which the quick service feature of the invention will again come into play.

I claim:

1. For use on a railway car having a brake pipe charged with fluid under pressure, a control valve device for applying the car brakes in response to a reduction of said brake pipe fluid pressure comprising:
   (a) an auxiliary reservoir charged with fluid at a certain chosen pressure corresponding to the fluid pressure carried in said brake pipe;
   (b) a piston abutment subject on opposite sides thereof to said brake pipe fluid pressure and said auxiliary reservoir fluid pressure, movement of said piston abutment from a release position toward a service application position being initiated by a pressure differential thereacross in response to a reduction of said brake pipe fluid pressure;
   (c) a bushing fixed in the body of said control valve device, said bushing comprising a bore at least a portion of which forms a valve seat face, said piston abutment being operably disposed in said bore;
   (d) a slide valve carried by said piston abutment and having a face portion engageable with said valve seat face, said slide valve being operable in response to said movement of said piston abutment to a quick service position intermediate said release position and said service application position to effect a further reduction of said brake pipe fluid under pressure; and (e) detent means for retarding said movement of said piston abutment in said quick service position until said pressure differential exceeds a predetermined value.

2. A control valve device as recited in claim 1, further comprising:

(a) first and second passages in said bushing opening at said valve seat face portion, one of said first and second passages having said brake pipe fluid under pressure connected thereto and the other of said first and second passages being vented;

(c) said slide valve interconnecting said first and second passageways in said quick service position of said piston abutment; and (d) spring means for biasing said slide valve into face-to-face engagement with said valve seat of said bushing.

3. A control valve device as recited in claim 2, wherein said bushing further comprises a spring bearing surface formed along said bushing bore diametrically opposite said valve seat face portion.

4. A control valve device as recited in claim 3, wherein said spring means comprises a leaf-type spring having ends thereof slidably engageable with said spring bearing surface and having a connection with said slide valve at a location intermediate said ends.

5. A control valve device as recited in claim 4, wherein said detent means comprises:

(a) a recess in said spring bearing surface; and
(b) at least one of said ends of said leaf spring resting in said recess in abutting relationship with one side of said recess when said piston abutment is in said quick service position.

6. A control valve device as recited in claim 5, wherein said at least one end of said spring is upturned.

7. A control valve device as recited in claim 6, wherein said one side of said recess is inclined.

8. A control valve device as recited in claim 7, wherein the angle of inclination of said one side of said recess is approximately 60°.

9. A control valve device as recited in claim 7, wherein the dimension of said recess in the axial direction of movement of said piston abutment is such that said one end of said spring rests in said recess only in the range of movement of said piston abutment between said release position and said quick service position.

10. A control valve device as recited in claim 5, wherein the depth of said recess is between 0.020 inch and 0.030 inch.

11. A control valve device as recited in claim 6, wherein the other side of said recess is inclined.

12. A control valve device as recited in claim 11, wherein the angle of inclination of said other side of said recess is approximately 20°.

13. A control valve device as recited in claim 5, wherein the other end of said leaf spring is upturned.

14. A control valve device as recited in claim 4, wherein said slide valve includes a bifurcated lateral extension within which said piston abutment is disposed, said bifurcated lateral extension including means for pivotally connecting said spring means to said slide valve.

15. A control valve device as recited in claim 14, wherein said pivotal connecting means comprises:

(a) a pin fixed in said bifurcated lateral extension of said slide valve; and
(b) an opening in said leaf spring intermediate said ends thereof through which said pin passes, the axis of said opening being transverse to the axis of said piston abutment.

16. A control valve device as recited in claim 14, wherein the axis of said opening in said leaf spring is displaced relative to a plane in which said ends of said leaf spring lie in the free state of said leaf spring.

17. A control valve device as recited in claim 16, wherein the distance said axis of said opening is displaced relative to said plane decreases when said piston abutment is disposed in said bore of said bushing, whereby said leaf spring is loaded in compression between said slide valve and said spring bearing surface of said bore.

18. A control valve device as recited in claim 15, wherein said leaf spring is disposed within said bifurcated lateral extension of said slide valve.

19. A control valve device as recited in claim 16, wherein said ends of said leaf spring lie in a line parallel to the axis of said piston abutment.

* * * * *